Sept. 10, 1935.   H. B. ROGERS   2,014,053
VEGETABLE WASHING DEVICE
Filed April 8, 1932   3 Sheets-Sheet 1

INVENTOR
H. B. Rogers
BY
ATTORNEY

WITNESS

Sept. 10, 1935.　　　　H. B. ROGERS　　　　2,014,053
VEGETABLE WASHING DEVICE
Filed April 8, 1932　　　3 Sheets-Sheet 2

Sept. 10, 1935.  H. B. ROGERS  2,014,053
VEGETABLE WASHING DEVICE
Filed April 8, 1932  3 Sheets-Sheet 3

WITNESS

INVENTOR
H. B. Rogers,
BY
ATTORNEY

Patented Sept. 10, 1935

2,014,053

UNITED STATES PATENT OFFICE 2,014,053

VEGETABLE WASHING DEVICE

Horace B. Rogers, Norfolk, Va.

Application April 8, 1932, Serial No. 604,084

5 Claims. (Cl. 146—194)

My invention relates to improvements in vegetable washing devices and it consists in the combinations, constructions and arrangements herein described and claimed.

An object of my invention is to provide a device of the type mentioned which is especially adaptable for washing vegetables such as spinach and the like and which is provided with means for washing one side of the vegetable then turning the vegetable over and washing the other side thereby assuring thorough cleaning.

A further object of the invention is to provide a washing device which will thoroughly cleanse the vegetables, but which will leave them in a fresh, unbruised, untorn and unbroken condition ready for the market.

A further object is to provide a device whereby water under pressure may be ejected in fine streams, these streams having considerable force and reaching all parts of the vegetable.

A further object is to provide a device in which the dirt is screened out during the washing process so that when the vegetable is delivered it is thoroughly cleaned.

Other objects and advantages will appear in the following specification and the novel features of the invention will be particularly pointed out in the appended claims.

My invention is illustrated in the accompanying drawings forming part of this application in which.

Figure 1:
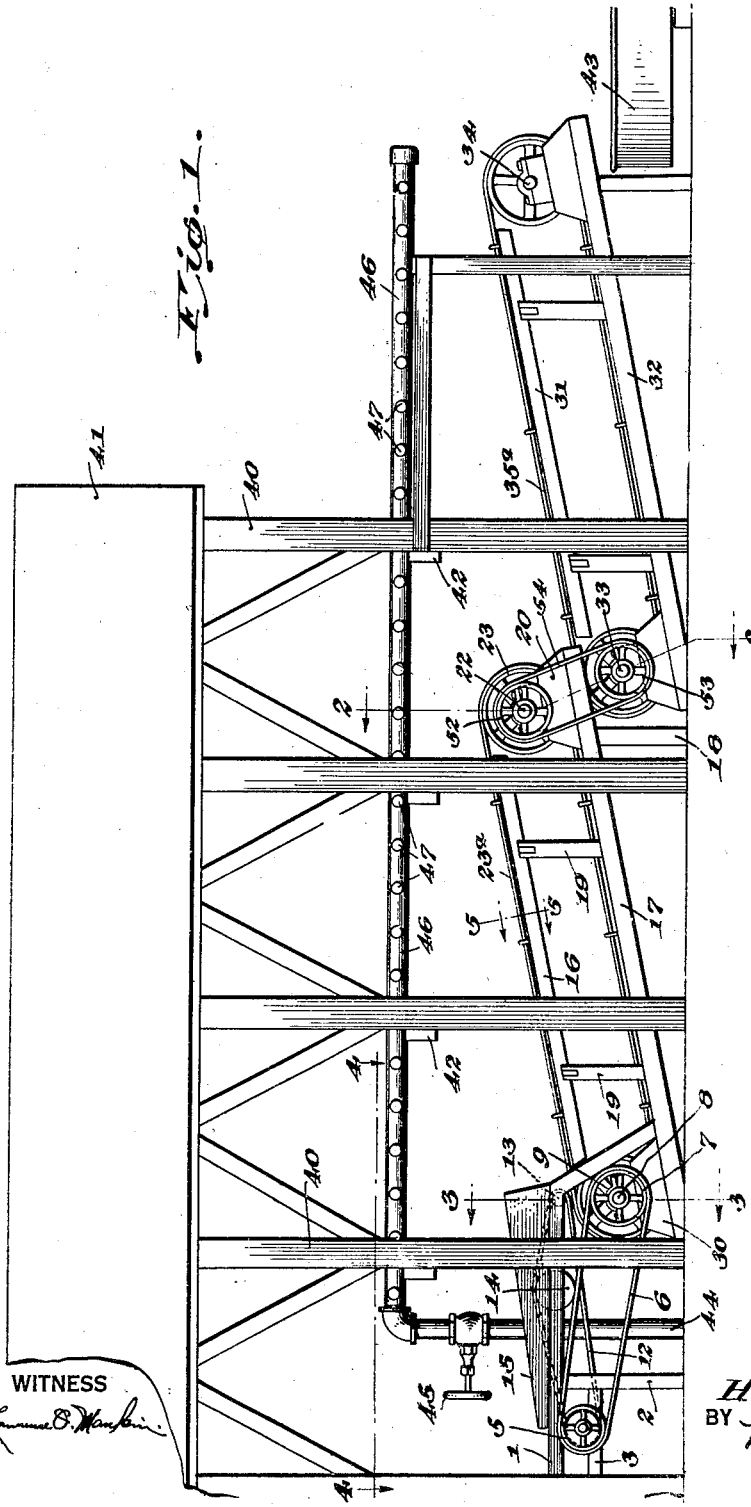
Figure 1 is a side elevation showing one embodiment of my invention.

In carrying out my invention I provide a table 1 which is supported in any suitable manner as by legs 2. The frame member 3 of the table (see Fig. 1) bears a shaft 4 (see Fig. 4) having at one end a pulley 5 which is connected by a belt 6 with a pulley 7 on a shaft 8. The latter is supported in suitable bearings 9 and 10.

Figure 4:
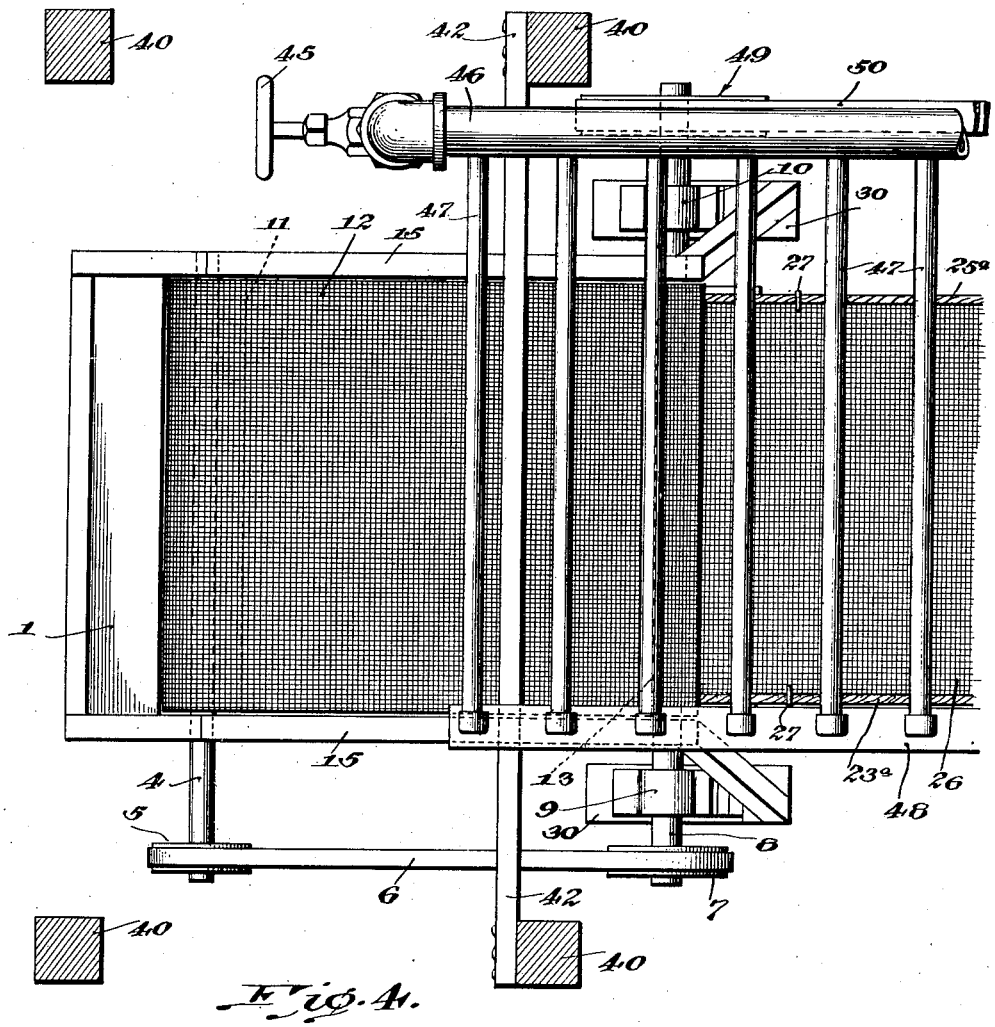
Fig. 4 is an enlarged section along the line 4—4 of Fig. 1 looking in the direction of the arrows.
Figure 5:
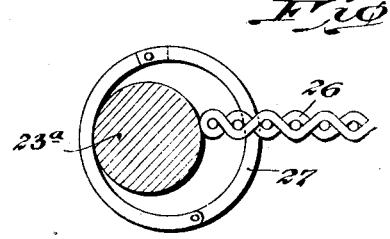
Fig. 5 is a section along the line 5—5 of Fig. 1.

Arranged to travel over a drum 11 at one end is an endless conveyor, shown in the present instance as a screen 12 (see Fig. 4). The opposite end passes over a drum 13 and between these is an idler 14 (see Fig. 1). Side members 15 are provided for guiding the vegetables. At the end of the delivery conveyor just described is a second conveyor. This conveyor is formed of inclined upper and lower struts 16 and 17, respectively, the latter resting upon the floor at one end and being supported by uprights 18 at the other end. Frame members 19 connect the upper and lower struts 16 and 17. The opposite side of the conveyor is similarly constructed. As will be seen from Figs. 1 and 2 there are blocks 20 upon which are mounted bearings 21 for a shaft 22. On this shaft are mounted wheels 23, 24 and 25 (see Fig. 2). The wheels 23 and 25 have grooves for receiving ropes 23a and 25a, respectively. An endless conveyor screen 26 is secured at its side edges to the ropes 23a and 25a by means of rings 27 like that shown in Fig. 5, these rings passing through the screen near the edges. For supporting the screen I provide longitudinal strips 16. The shaft 8 which is driven by the pulley 7 is mounted in bearings 9 and 10, on blocks 30 and it has three wheels 23x, 24x and 25x corresponding to the wheels 23, 24 and 25 shown in Fig. 2.

A third conveyor member is formed on an inclined frame work consisting of upper and lower members 31 and 32, respectively. Located at their opposite ends are shafts 33 and 34. The shaft 33, as will be seen from Fig. 2, has three wheels 35, 36 and 37, the wheels 35 and 37 being provided with grooves for ropes 35a and 37a, respectively.

Figure 2:
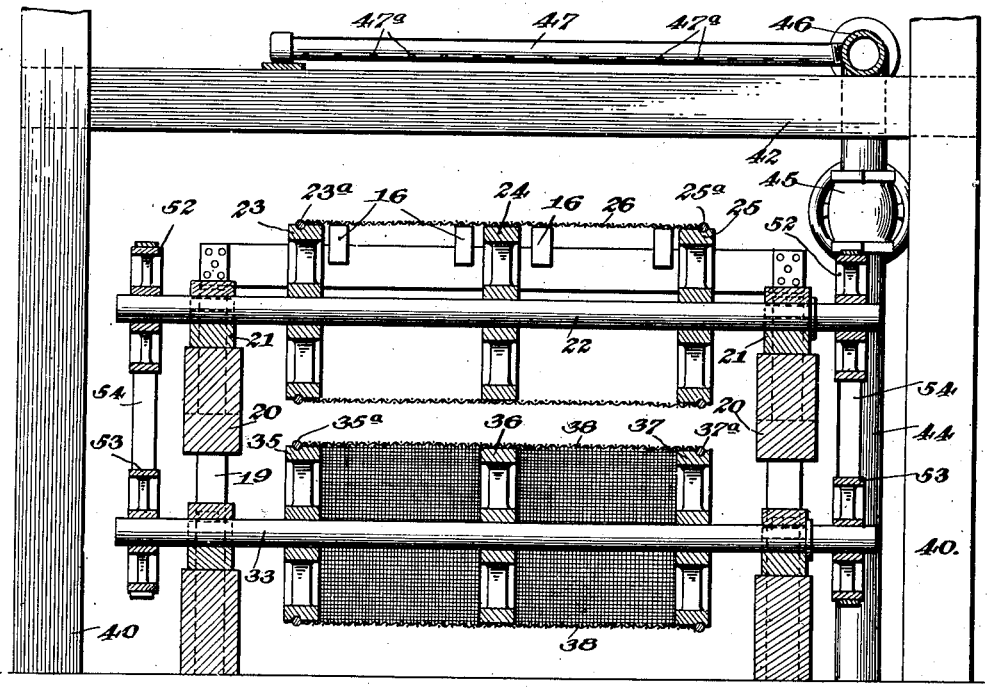
Fig. 2 is an enlarged section along the line 2—2 of Fig. 1.

The shafts 34 at the right in Fig. 1 bears three wheels, not shown, but which are precisely the same as those shown at 35, 36 and 37 in Fig. 2 and an endless conveyor in the form of a screen 38 runs over these wheels and is supported by longitudinally inclined strips 31 similar to the strips 16 already described.

A shed or cover is preferably used with this washing device and consists of the uprights 40 with a roof 41 and transverse members 42 between the uprights 40 on opposite sides of the device. At one end of the conveyor, i. e., the right hand in Fig. 1 is a receptacle 43 for receiving the cleaned vegetables.

The water is supplied through a pipe 44 from any suitable source. This pipe is controlled by a valve 45. This pipe has a horizontally extending portion 46 and to this horizontally extending portion are connected pipes 47 which project transversely above the screens 12, 26 and 38 as shown in Fig. 4. The ends of these pipes rest on a longitudinal frame member 48 and the pipes are perforated on their under side as shown at 47a in Fig. 2 to provide exits for the water.

Figure 3:
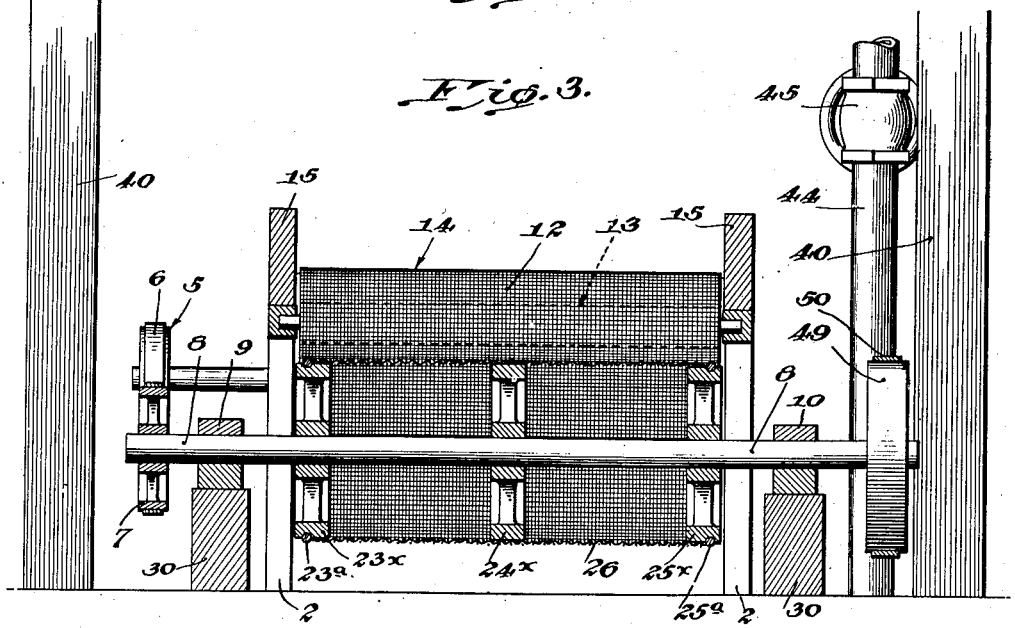
Fig. 3 is an enlarged section along the line 3—3 of Fig. 1.

As will be seen in Fig. 3 the shaft 8 has a pulley 49 over which a belt 50 runs. This belt receives power from any suitable source and turns the shaft 8. The wheels 23x and 25x through the medium of the rope drives 23a and 25a turn the wheels 23, 24 and 25 and the shaft 22 upon which they are mounted. The shaft 22 bears a pulley 52 on each end thereof which drives a companion pulley 53 on the shaft 33 through the medium of belts 54. The wheels 35 and 37 through the medium of the ropes 35a and 37a drive the wheels, (not shown) on the shaft 34. The arrangement is such that the upper part of the belts or screens are driven from left to right in Fig. 1.

From the foregoing description of the various parts of the device the operation thereof will be readily understood. The spinach or other vegetable is fed onto the short conveyor belt or screen 12 and is dumped onto the screen 26. This conveys the vegetables forwardly and upwardly. In the meantime streams of water are coming from the perforations of the pipes 47, these being fine jets of sufficient velocity to wash the dirt through the screens so as to clean the vegetables. When the vegetables reach the end of the second conveyor they are dumped onto the third conveyor. As will be seen from Figure 1, the pipes 47 are so disposed that they project streams of water on the vegetables while they are passing over the end of the second conveyor, and also while they are dropping from the second conveyor to the third conveyor. The vegetables are not only turning on the ends of the conveyor but are turning over in the air and are sprayed by the streams of water which reach portions that may not be reached even after the vegetables are completely turned over. The vegetables lie on the third conveyor in substantially inverted position from that on the second conveyor so that parts heretofore unexposed are now subjected to the streams of water, thus cleansing them thoroughly.

It will be noted that due to the inclination of the conveyors the first action of the water is a softening action and that as the conveyors carry the vegetables along they come nearer to the course of water where the jets have greater power and hence a greater cleaning action. I have found that in the use of a device of this kind, vegetables which are rather difficult to clean, such as spinach, are quickly and thoroughly cleaned and in fact better cleaned than when washed by hand.

I am aware that there are washing devices such as those used by canning plants, which clean vegetables, but which leave them in a broken or bruised condition. The present device, while thoroughly cleaning the vegetables, leaves them fresh, unbroken, untorn and unbruised so that they may be ready for immediate sale in the markets to which they are shipped.

I claim:

1. In a vegetable washing device, a table, a conveyor belt carried by the table for delivering vegetables, an inclined conveyor for receiving the vegetables delivered from the table, said conveyor having an endless unobstructed wire screen, means for projecting water on the vegetables on said endless screen, an inclined conveyor at the end of said first inclined conveyor, the delivery end of said first named conveyor being above the receiving end of the second named conveyor whereby vegetables from the first named inclined conveyor will be turned over when delivered to the second named inclined conveyor, a series of perforated water pipes extending transversely of said conveyors and being arranged in a horizontal plane above the conveyors, and means for delivering water to said transverse pipes.

2. A vegetable washing device comprising an inclined conveyor having an endless belt of perforated material, said conveyor having grooved wheels at its ends on each side, means for driving the wheels at one end, endless ropes running over said grooved wheels, and a series of spaced rings loosely encircling the rope and attached to the belt for preventing undue lateral motion of the belt while permitting the longitudinal movement of the belt with respect to the ropes.

3. In a vegetable washing device, a pair of conveyors including an endless belt of wire mesh for each conveyor, the conveying surfaces of said wire belts being unobstructed and the rear end of the first belt terminating above the forward end of the second belt whereby vegetables on the first belt will be turned over on the second belt, means for projecting streams of water on the vegetables during their entire travel on said belts, and means for actuating the conveyors.

4. A vegetable washing device comprising a pair of inclined conveyors, each conveyor having an endless belt of wire screen, and the delivery end of one conveyor being above the receiving end of the other conveyor whereby vegetables passing from one conveyor to the other conveyor will be turned over, means for projecting streams of water of uniform pressure on the vegetables during their travel on the conveyor and while they are being turned over when passing from one conveyor to another said means being disposed closer to the delivery ends of both conveyors whereby, the force of said streams of water is progressively greater from the receiving end to the delivery end of each of said conveyors.

5. In a vegetable washing device, a pair of inclined conveyors, each conveyor comprising an endless screen, the end of one conveyor being located below the upper end of the adjacent conveyor whereby the vegetables are delivered from one conveyor to the other and are turned over in transit from one conveyor to the other, and means disposed above said conveyors for projecting streams of water on the vegetables during their entire travel on both of said conveyors and while they are being turned over in passing from one conveyor to the other.

HORACE B. ROGERS.